United States Patent
McCoy (10) Patent No.: US 9,286,483 B2
(45) Date of Patent: *Mar. 15, 2016

(54) PROTECTING VISIBLE DATA DURING COMPUTERIZED PROCESS USAGE

(71) Applicant: International Business Machines Corporation, Armonk, NY (US)

(72) Inventor: Doyle J. McCoy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,882

(22) Filed: Apr. 20, 2015

(65) Prior Publication Data

US 2015/0227750 A1 Aug. 13, 2015

Related U.S. Application Data

(63) Continuation of application No. 13/796,631, filed on Mar. 12, 2013, now Pat. No. 9,043,612.

(51) Int. Cl.
| | | |
|---|---|---|
| *G06F 3/00* | (2006.01) | |
| *G06F 21/62* | (2013.01) | |
| *G06F 12/14* | (2006.01) | |
| *H04L 29/06* | (2006.01) | |
| *G06F 12/10* | (2006.01) | |

(52) U.S. Cl.
CPC .............. *G06F 21/62* (2013.01); *G06F 12/145* (2013.01); *G06F 12/1483* (2013.01); *H04L 63/08* (2013.01); *G06F 12/1009* (2013.01)

(58) Field of Classification Search
USPC ............... 713/164, 187, 189, 193; 726/23; 711/163, 207, 206; 719/319
See application file for complete search history.

(56) References Cited

U.S. PATENT DOCUMENTS

| | | | | | |
|---|---|---|---|---|---|
| 5,247,632 | A | * | 9/1993 | Newman | G06F 7/544 365/230.01 |
| 6,854,039 | B1 | * | 2/2005 | Strongin | G06F 12/1491 711/145 |
| 7,398,389 | B2 | * | 7/2008 | Teal | G06F 21/57 713/164 |
| 8,032,898 | B2 | * | 10/2011 | Hunt | G06F 9/468 719/319 |
| 8,108,641 | B2 | * | 1/2012 | Goss | G06F 12/1408 711/163 |

(Continued)

OTHER PUBLICATIONS

IBM, "Enterprise privacy authorization language (EPAL)", http://www.zurich.ibm.com/pri/projects/epal.html, Printed Jul. 2, 2012, 3 pages.

(Continued)

*Primary Examiner* — Joseph P Hirl
*Assistant Examiner* — Sayed Beheshti Shirazi
(74) *Attorney, Agent, or Firm* — Noah A. Sharkan; Hunter E. Webb; Keohane & D'Alessandro PLLC (57) ABSTRACT

Embodiments of the present invention provide an approach for protecting visible data during computerized process usage. Specifically, in a typical embodiment, when a computerized process is identified, a physical page key (PPK) is generated (e.g., a unique PPK may be generated for each page of data) and stored in at least one table. Based on the PPK a virtual page key (VPK) is generated and stored in at least one register. When the process is later implemented, and a request to access a set of data associated the process is received, it will be determined whether the VPK is valid (based on the PPK). Based on the results of this determination, a data access determination is made.

14 Claims, 5 Drawing Sheets

(56) References Cited

U.S. PATENT DOCUMENTS

| | | | | |
|---|---|---|---|---|
| 8,171,309 B1* | 5/2012 | Poo | G06F 11/3648 | 713/182 |
| 8,631,203 B2* | 1/2014 | Fortin | G06F 12/0893 | 711/115 |
| 2004/0098544 A1* | 5/2004 | Gaither | G06F 12/023 | 711/154 |
| 2006/0224816 A1* | 10/2006 | Yamada | G06F 12/109 | 711/6 |
| 2007/0198851 A1* | 8/2007 | Goto | G06F 12/145 | 713/187 |
| 2007/0294496 A1* | 12/2007 | Goss | G06F 12/408 | 711/163 |
| 2009/0300611 A1* | 12/2009 | Devine | G06F 12/1009 | 718/1 |
| 2009/0300612 A1* | 12/2009 | Devine et al. | | 718/1 |
| 2009/0300645 A1* | 12/2009 | Devine et al. | | 718/107 |
| 2009/0327647 A1* | 12/2009 | Ingle | G06F 12/1027 | 711/207 |
| 2011/0161619 A1* | 6/2011 | Kaminski | G06F 9/5016 | 711/207 |
| 2011/0161620 A1* | 6/2011 | Kaminski | G06F 12/1009 | 711/207 |
| 2012/0011351 A1* | 1/2012 | Mundra | G06F 21/72 | 713/1 |
| 2012/0047348 A1* | 2/2012 | Devine et al. | | 711/206 |
| 2012/0151184 A1* | 6/2012 | Wilkerson | G06F 8/43 | 712/36 |
| 2012/0255004 A1* | 10/2012 | Sallam | G06F 21/554 | 726/23 |
| 2012/0297139 A1* | 11/2012 | Choi | G06F 12/1009 | 711/122 |
| 2013/0283017 A1* | 10/2013 | Wilkerson | G06F 9/322 | 712/225 |

OTHER PUBLICATIONS

Engler et al., "Exokernel: An Operating System Architecture for Application-Level Resource Management", Association for Computing Machinery, Inc., Copyright 1995, 16 pages.

James H. Morris Jr., "Protection in Programming Languages", Association for Computing Machinery, Inc., Copyright 1973, pp. 15-21.

Morrison et al., "The Napier88 Persistent Programming Language and Environment", University of Glasgow and University of St. Andrews, 1999, 68 pages.

U.S. Appl. No. 13/796,631, Office Action Communication, Aug. 18, 2014, 36 pages.

U.S. Appl. No. 13/796,631, Notice of Allowance, Jan. 21, 2015, 19 pages.

* cited by examiner

PROTECTING VISIBLE DATA DURING COMPUTERIZED PROCESS USAGE

RELATED APPLICATION

The present patent document is a continuation of U.S. patent application Ser. No. 13/796,631, filed Mar. 12, 2013, entitled "PROTECTING VISIBLE DATA DURING COMPUTERIZED PROCESS USAGE", the disclosure of which is incorporated herein by reference.

TECHNICAL FIELD

Embodiments of the present invention relate generally to data security/protection. Specifically, embodiments of the present invention relate to the use of keysets to protect visible data during computerized process usage.

BACKGROUND OF THE INVENTION

Statutory provisions today may include aspects that affect many industries with concerns such as personal data security, banking data security, medical data protection, etc. As these provisions become increasingly complex, it has become more difficult for a service provider to avoid access to unauthorized data and still provide their contracted services. One cause of such issues has to do with data residing in main storage and the ability of a processor to load that data for use by an application that is genuinely entitled to access that data at that moment in time versus an application that has not been entitled to access that information.

Existing solutions generally provide programming to specifically clear memory used for sensitive data after use, including operating system page clearing of released pages before being allocated to other processes. However, during use of sensitive data, the data may be visible to any process with addressability to the storage space (including in-system state where the memory is simply the memory). As such, challenges may exist in protecting such data while visible and subject to use by one or more processes.

SUMMARY

Embodiments of the present invention provide an approach for protecting visible data during computerized process usage. Specifically, in a typical embodiment, when a computerized process is identified, a physical page key (PPK) is generated (e.g., a unique PPK may be generated for each page of data) and stored in at least one table. Based on the PPK, a virtual page key (VPK) is generated and stored in at least one register. When the process is later implemented, and a request to access a set of data associated with the process is received, it will be determined whether the VPK is valid (based on the PPK). Based on the results of this determination, a data access determination is made.

A first aspect of the present invention provides a computer-implemented method for managing data security, comprising: identifying a computerized process; generating a physical page key (PPK) for the computerized process, the PPK being stored in at least one table in at least one computer storage device; generating a virtual page key (VPK) based on the PPK, the VPK identifying the process and a set of data authorized to be used by the process; receiving a request to access the set of data via the process; determining a validity of the VPK based on the PPK; and making a data access determination based on the validity.

A second aspect of the present invention provides a system for managing data security, comprising: a bus; a processor coupled to the bus; and a memory medium coupled to the bus, the memory medium comprising instructions to: identify a computerized process; generate a physical page key (VPK) for the computerized process, the PPK being stored in at least one table in at least one computer storage device; generate a virtual page key (VPK) based on the PPK, the VPK identifying the process and a set of data authorized to be used by the process; receive a request to access the set of data via the process; determine a validity of the VPK based on the PPK; and make a data access determination based on the validity.

A third aspect of the present invention provides a computer program product for managing data security, the computer program product comprising a computer readable storage media, and program instructions stored on the computer readable storage media, to: identify a computerized process; generate a physical page key (PPK) for the computerized process, the PPK being stored in at least one table in at least one computer storage device; generate a virtual page key (VPK) based on the PPK, the VPK identifying the process and a set of data authorized to be used by the process; receive a request to access the set of data via the process; determine a validity of the VPK based on the PPK; and make a data access determination based on the validity.

A fourth aspect of the present invention provides a method for deploying a system for managing data security, comprising: providing a computer infrastructure being operable to: identify a computerized process; generate a physical page key (PPK) for the computerized process, the PPK being stored in at least one table in at least one computer storage device; generate a virtual page key (VPK) based on the PPK, the VPK identifying the process and a set of data authorized to be used by the process; receive a request to access the set of data via the process; determine a validity of the VPK based on the PPK; and make a data access determination based on the validity.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for protecting visible data during computerized process usage. Specifically, in a typical embodiment, when a computerized process is identified, a physical page key (PPK) is generated (e.g., a unique PPK may be generated for each page of data) and stored in at least one table. Based on the PPK, a virtual page key (VPK) is generated and stored in at least one register. When the process is later implemented, and a request to access a set of data associated with the process is received, it will be determined whether the VPK is valid (based on the PPK). Based on the results of this determination, a data access determination is made.

Figure 1:
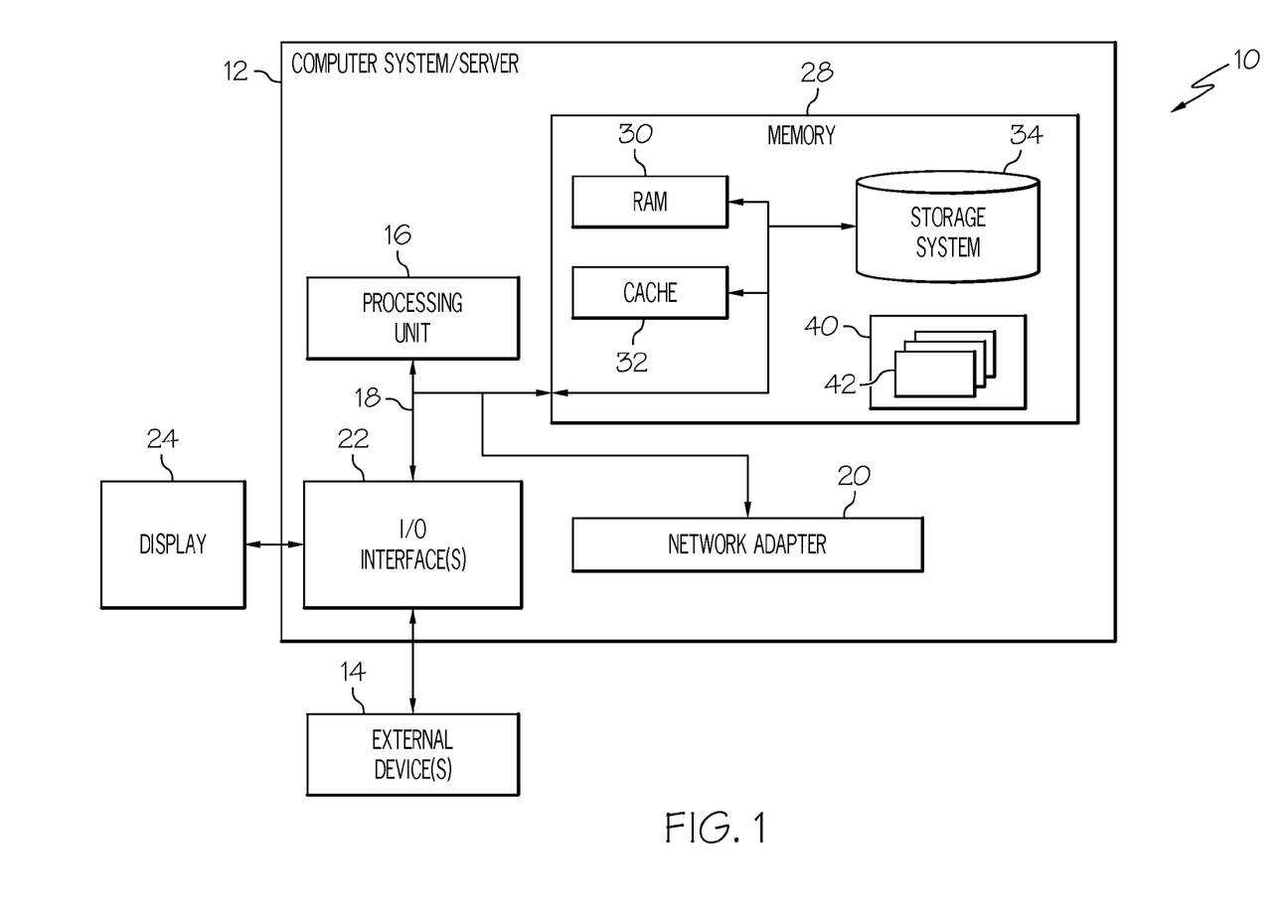
FIG. 1 depicts a computing node according to an embodiment of the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Data protection program/utility 40, having a set (at least one) of program modules 42, may be stored in memory 28 by way of example, and not limitation. Memory 28 may also have an operating system, one or more application programs, other program modules, and program data. In general, data protection program 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
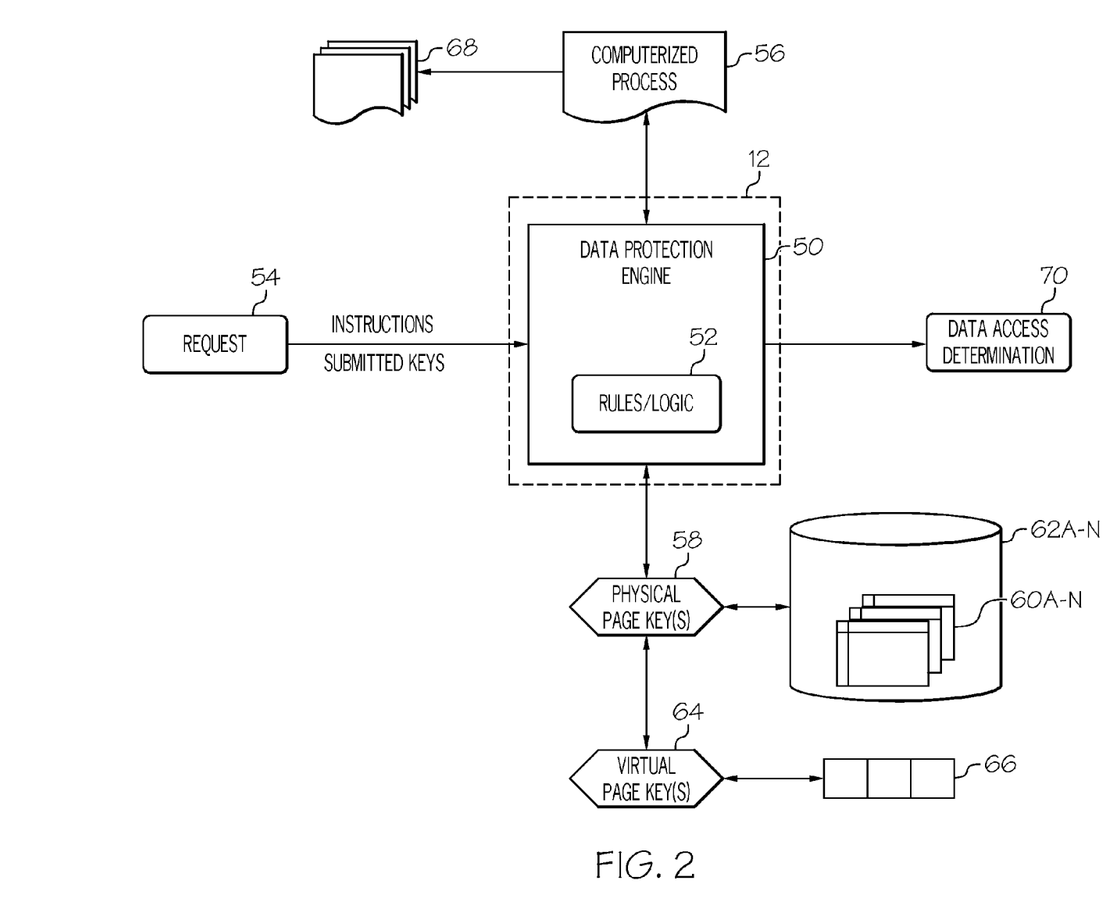
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment, each client need not have a data protection engine (engine 50). Rather, engine 50 could be loaded on a server (e.g., payment processing server) or server-capable device that communicates (e.g., wirelessly) with the clients to provide data protection/security functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides data protection/security functionality hereunder.

Along these lines, engine 50 may perform multiple functions similar to a general-purpose computer. Specifically, among other things, engine 50 may: identify a computerized process 56; generate a physical page key (PPK 58) for the computerized process 56 (e.g., generate a PPK 58 using any key generation algorithm for each page of data associated with the process 56), the PPK 58 being stored in at least one table 60A-N (e.g., a physical page table and/or a physical protection table) in at least one computer storage device 62A-N; generate a virtual page key (VPK 64) based on the PPK (e.g., for storage in at least one register 66), the VPK identifying the process 56 and a set of data 68 authorized to be used by the process 56; protect the set of data 68 with the PPK 58 and VPK 64; receive a request 54 to access the set of data 68 via the process 56 (e.g., the request being accompanied with a submitted keyset); determine a validity of the VPK 64 based on the PPK 58 (e.g., determine whether the submitted VPK 64 matches the generated VPK 64 and/or determine if the submitted VPK 64 was truly generated from the PPK 58); and make a data access determination 70 based on the validity.

Illustrative Examples

Figure 3:
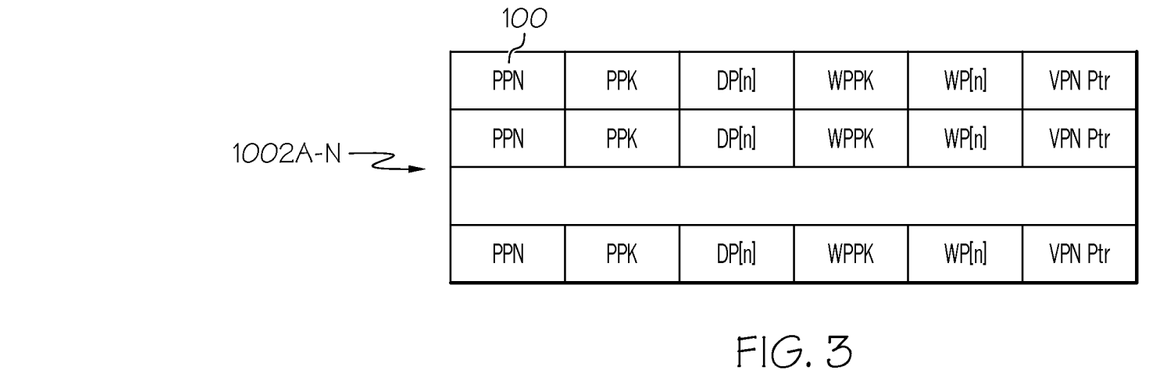
FIG. 3 depicts an illustrative physical page table according to an embodiment of the present invention.

The following section will describe additional features within the context of one or more illustrative examples. It is understood that these examples are not intended to be limiting or exhaustive. In any event, the embodiments of the present invention may provide the following additional functionality:

Handling Page Tables:

Page table information in a secure system may be stored in memory only accessible to the system or kernel state of the CPU. Multiple illustrative methods exist for the storage of the physical page key. A first approach would be through the implementation or extension of entries 102A-N of a physical page table 100, an example of which is shown in FIG. 3. As depicted, the extension may result in the addition of the physical page key (PPK), and a data protection (DP[n]) bit array (one entry for each protected memory granule). To support write-protected granules, a write protection page key (WPPK) and an associated write protection bit array (WP[n]) may also be provided, as well as a virtual page number page table register (VPN Ptr). Thus, each entry 102A-N of table 100 may include a physical page number (PPN), a PPK, a DP[n], a WPPK, a WP[n], and/or a VPN Ptr.

Figure 4:
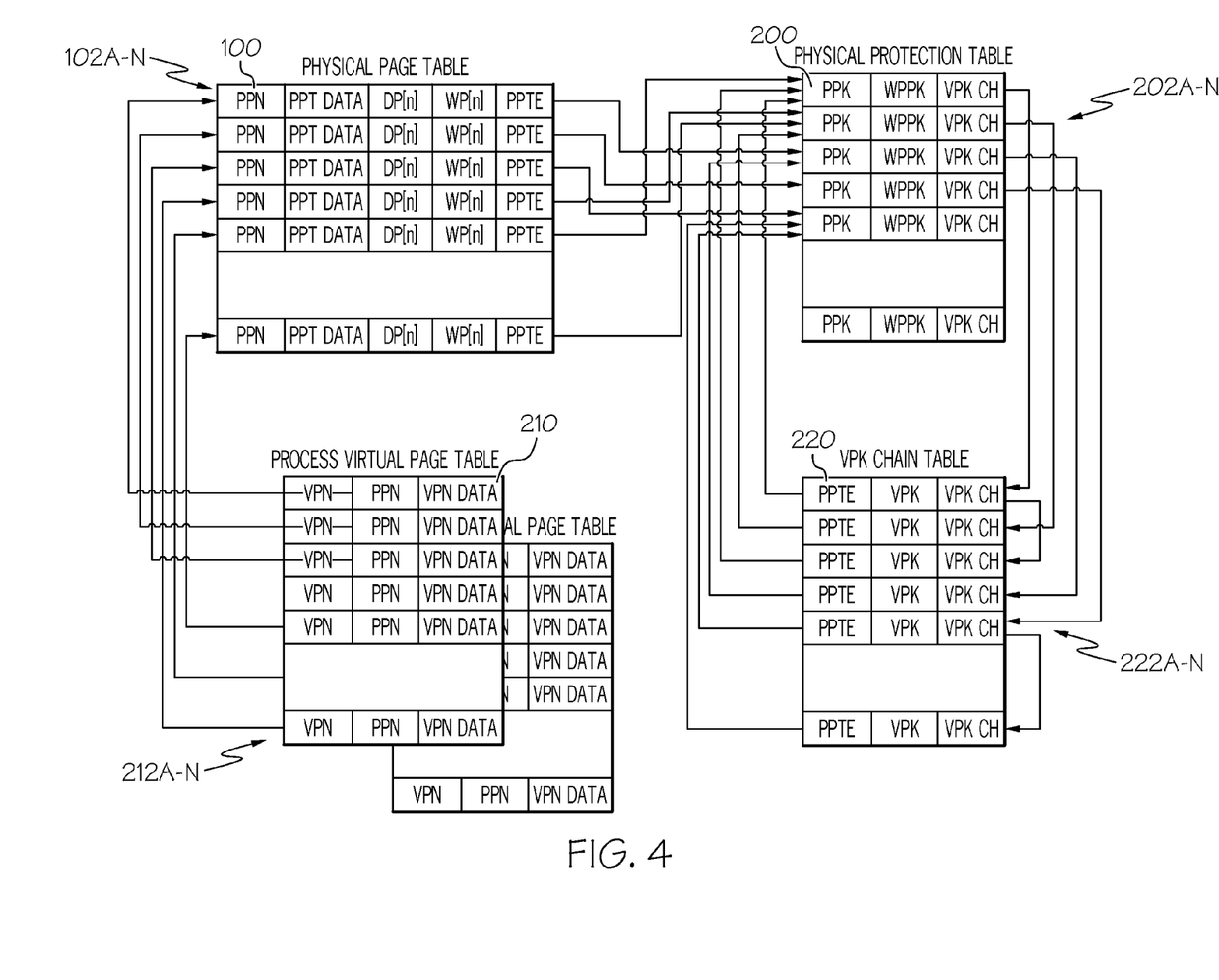
FIG. 4 depicts an illustrative physical protection table according to an embodiment of the present invention.

Another method for storing the physical page key would be through the use of a physical protection table 200 as shown in FIG. 4 as associated with a corresponding physical page table 100 (shown in FIG. 3), a process virtual page table 210, and a virtual page key chain table 220. Along these lines, entries 102A-N, 202A-N, 212A-N, and 222A-N may be mapped via pointers to one another as shown.

In any event, an exemplary implementation of a physical protection table 200 may result in modification to entries 102A-N of physical page table 100 to include a reference (index or pointer) to a corresponding physical protection table entry (PPTE). This PPTE would line tables 100 and 200 by containing the physical page key (PPK), the write protection page key (WPPK), and the virtual page key chain reference, index, or pointer (VPK Ch) as shown in entries 202A-N of physical protection table 200. In this approach, the physical page table 100 is only increased by the size of the bits required for the data protection (DP) and write protection (WP) arrays along with the PPTE reference. An alternative to this method would be to extend the physical page table 100 to include the PPK, WPPK and VPK Ch references. As further shown, entries 102A-N of physical page table 100 may each include a PPN, which is linked/associated with PPNs of entries 212A-N of process virtual page table 210. As further shown, entries 212A-N of process virtual page table 210 further include a virtual page number (VPN) and corresponding VPN data. Still yet, VPK Ch portions of entries 202A-N of physical protection table 200 are linked to/associated with VPK Ch portions of entries 222A-N of VPK chain table 220. As further shown, entries 222A-N also include PPTE portions (similar to entries 102A-N of physical page table 100) as well as virtual page key (VPK) portions.

In general, this approach may result in a larger physical page table and redundant data. Since the implementation requires that processes accessing the data on a page use a unique virtual page key, it may be necessary to provide a chain of virtual page key entries (VPKE) in a virtual chain table (VCT). The virtual chain table may also contain multiple linked lists. Each entry may contain a unique virtual page key that may be in use by a process. In general, each VPK may be used by at least one process. A PPTE reference (pointer or index) allows each VPKE to refer to a PPTE containing the PPK for the pages of the physical page table referencing that PPK.

For a system using private address space environments (PASE), a process virtual page table (process VPT) can store the physical pages and the associated virtual page of each process. Multiple process VPTs may exist (one for each process). No major enhancements need be provided for the process VPT environment. For systems using single level storage, a virtual address page table may store virtual storage information for the entire system. No major enhancements are required for the single level storage virtual address page table.

Handling Data Protection Translation Misses:

It may be the case that an operating system would have support for a hardware-based translation look-aside buffer as well as page table support for the virtual process. It may also be the case that the hardware in a data protection environment may have a data protection miss, as it would have a TLB miss that would be software kernel supported. In such a system, the kernel would look up the information to support the DP translation that was missed, and, if possible, program that information into the DP translation buffer of the hardware such that a return from miss with retry will succeed. If a DP translation miss was not able to be fulfilled, the kernel may extend the DPT miss into a data protection exception.

Handling System Memory:

The kernel of an operating system may provide itself with one or more VPKs or master page keys (MPKs) for protection of various internal data structures. This may help with protection of data used in various kernel data structures that should never become visible to outside processes. Even within the kernel, allocated pages with a particular PPK may be described as an activation. Each activation (in kernel state or user state) may support the creation of a unique PPK and VPK.

Creation of a Process:

A process context being created by the kernel would incur a step to create an initial activation for the process. During the activation creation, a PPK and VPK for the process would be created. Physical memory pages being allocated would then be assigned this PPK with a clear DP and WP mask. During the load of the program, a loadable program format (e.g., COFF, XCOFF) may be extended to include a DP and WP mask for various pages (including static data segments and or data extension methods (for permanent structures within the programs). At load time, the mask may be read from secondary storage prior to the load of the segment needing protection, and that mask may be used to set the protection mask for the page about to be loaded.

Handling Dynamic Libraries:

A dynamic library may be defined to operate within its own activation. Since a dynamic library provides external linkage points, when a program branches or calls one of these routines, the routine may start in a caller's activation. A special programming language-based linkage from the compiler may produce a switch activation and call process that causes the VPK of the dynamic library to be loaded. It may also be desirable for the method to retain the VPK of the caller. Upon return from a method in a different activation, the activation state of the caller may be restored from system state memory including the VPK of the caller.

Handling System Calls:

System calls, which are typically implemented as software based interrupts, may need to store the state of the calling activation (along with which VPK was in use at the time of the call).

Setting a Page Data Protection Mask:

A system call would need to be defined to support the setting of a data protection mask for a particular virtual address page. This would result in clearing the data in those granules of memory whose DP mask was changed (from an on-to-off state, and also from an off-to-on state). The parameters to the system call would need to be the virtual address, length, and a reference to the DP or WP bitmaps. A separate call may be used to set the WP bitmap, or the same call may pass both parameters, or a parameter may be used to identify whether the WP bitmap or the DP bitmap was to be set. It may be noted that the clearing action may be designed primarily for the DP bitmap, but the WP bitmap may make use of the same construct to ensure that a program be set to write to that space after setting of the bitmap. The page protection mask system call would be intended to be used prior to read I/O operations at a page level for the block of memory into which the data is to be physically read.

Handling I/O requests:

Certain types of I/O may occur that require interfacing with protected data. Those occur within reads and writes. The key constraint for a write is that the I/O subsystem once directed to perform the I/O operation does not care about the DP or WP bits in the performance of the I/O. Therefore, an I/O write operation may simply be performed by the operating system during routine operations. A read operation, however, needs to protect the data brought into main storage immediately upon transfer to memory. There may be no time span for which the data in main storage may be accessible. To ensure this, and still maintain the best performance, the sequence for performing a physical I/O operation may look like the following, from within the process space:

A. The runtime system allocates virtual storage with the VPK of the caller requesting the I/O to read the data into.
B. The virtual storage is pinned (made resident) into storage on behalf of the process.
C. The virtual storage data protection mask is set using the set page data protection mask calls.
D. An I/O handle is allocated for the hardware subsystem referencing the virtual storage as the target buffer for the I/O. The rest of the information for the I/O is set up to perform the actual hardware I/O operation.
E. The I/O operation is performed.
F. The I/O status is prepared for return to the caller (if any).
G. The handle (from D) allocated that associates this virtual address with an I/O operation is deallocated.
H. The virtual storage is unpinned.

Similar processes may be employed for performing writes excepting the call to set the data protection mask.

Runtime library support must be capable of providing for such needs as memory allocation (heap), threads, and activations. Within a hardware data protection system, it makes sense that the runtime system must be capable of ensuring that the correct page keys are used when allocating memory, and being able to define an activation that requires a specific (and unique) page key. There are multiple memory allocation schemes such as: private address space environment and single level storage. There are also mixed environments where both are contained within the same environment.

In memory allocation in both worlds, the runtime library must become aware of the page level and granule level for data protection. The page level is the system's definition of a minimum allocated chunk of memory with respect to the I/O paging system (meaning the two are the same size). The granule describes the number of protectable chunks of memory within that page. So if a page is 4 KB in size, a granule may be 32 bytes long (equating to possibly one cache line in size, but may be some other equally dividable size such as 16, or 64, or 8). In 64 bit systems, 8 bytes may suffice, but the tradeoff is with respect to the amount of memory required to store the memory protection bits in the memory protection translation table or in the page table.

Those functions that are described in the operating system (OS) as system calls would need system call function APIs created to match within the runtime library. The concept of an activation may allow, within a process, separate memory page keys to be used in various activations in order to separate data, even within the same thread. An activation being in separate threads would also be separate from one another allowing for separate activation and providing isolation between threads. Thread creation may also be built so as to require the same activation identification maintained as the thread is built, thus allowing the created thread to share the same activation and memory "image" as the original thread.

System calls may be provided by the operating system for:
A. Setting the data protection or write protection mask for a page.
B. Creating an activation with a new PPK and assigning the VPK to the processor for that PPK.
C. Creating a VPK reference to a PPK during creation of threads and activations.

The above description provides references for minimum support needed from the OS kernel in order to provide multiple page VPK support. A compiler may define pragmas that allow the definition of the context in which a particular variable resides. Within that context, a particular VPK may be loaded as a result of the context switch prior to accessing a variable containing the restricted protection specifier. These pragmas (or context definitions) may be constructed as part of virtual page key creation such that creation of a page key would flow as:
1. Define context name and context identification (ID)
2. Create virtual page key
3. Associate context ID with virtual page key for compiler output of context switch instructions Within the memory management runtime, the context of the variable should remain consistent and provide for the access to context specific data. To do this, functions and modifications (as follows):

Memory management core (such as heap) would keep track of pages and contexts (with VPKs) for those pages. When a request for a new memory allocation is made by the calling program, in addition to other qualifications made by the memory management system, the memory management system would also look for space in a free page containing the same memory context. A list of linked lists by context ID may be used to track these pages, as well as the free space maps for those pages. Creation of a thread of execution would by default result in the creation of a new context identification. However, after creation, that thread may be passed the VPK reference to allow the thread to share the same protection context.

Another embodiment of the present invention provides an approach for describing protected data within a programming language. For the purpose of describing protected data within a programming language, an attribute of variables would need to be defined. Pointers may not typically be defined as protected data as they are not the actual data. However, the contents of what the pointer points to may be defined as protected. One similarity to the attribute needed is the c++ const attribute. One difference is that a pointer can be const in c++, but a pointer may not be protected data. Thus, all of the places within c++ where const is allowed, protected may also be an allowed attribute with the exception of a pointer. Shown below, is exemplary code to illustrate this feature:

```
int a;                      // integer a without protection
protected int b;            // integer b that is protected
int* c;                     // Pointer to integer c without protection.
protected int *d;           // pointer to protected integer d.
// Operationally
c=&a;                       // Legal because a and c are neither protected.
a=b;                        // Error to assign protected integer into a which
                            is not protected.
b=a;                        // Legal because we're raising the level of
                            protection
d=&a;                       // Error because assignment to *d would store
                            protected data to unprotected integer
d=&b;                       // Legal because b is protected, and d points to
                            protected int.
Functionally
int f(int x) { }            // Regular defined function f
protected int g(int x) { }  // function that returns protected int
protected int h(protected int x) { } // Protected int returned and protected int
                            passed
// Operationally
a=f(3);                     // Legal by normal standard
a=g(3);                     // Illegal as a is not protected and g returns
                            protected.
*d=g(b);                    // Legal *d is protected and b is protected.
```

Figure 5:
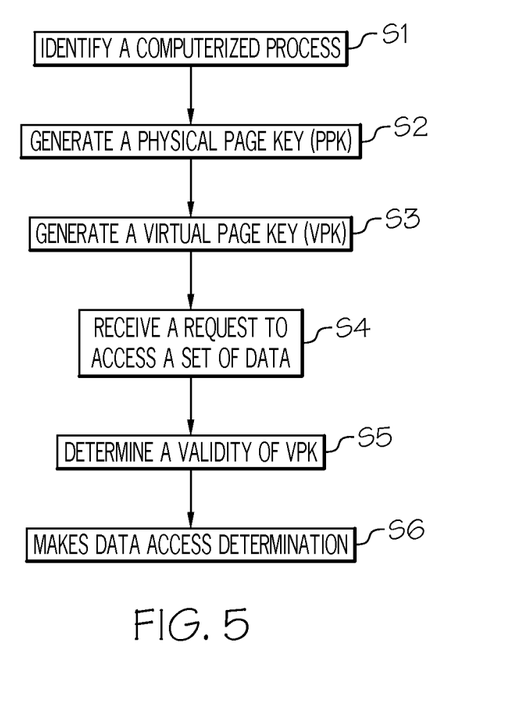
FIG. 5 depicts a method flow diagram according to an embodiment of the present invention.

Referring now to FIG. 5, a method flow diagram according to an embodiment of the present invention is shown (e.g., as enabled by engine 50 of FIG. 2). As depicted, in step S1, a computerized process is identified. In step S2, a physical page key (VPK) for the computerized process is generated, the physical key being stored in at least one table in at least one computer storage device. In step S3, a virtual page key (VPK) is generated based on the physical key, the virtual key identifying the process and a set of data authorized to be used by the process. In step S4, a request to access the set of data via the process is received. In step S5, a validity of the VPK based on the PPK is determined. Is step S6, a data access determination is made based on the validity.

While shown and described herein as data protection solution, it is understood that the invention further provides various alternative embodiments. For example, in one embodiment, the invention provides a computer-readable/useable medium that includes computer program code to enable a computer infrastructure to provide data protection as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data protection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for data protection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for managing data security, comprising:
    identifying a computerized process;
    generating a physical page key (PPK) for the computerized process;
    storing the PPK in at least one table, the at least one table comprising a physical protection table, the PPK being associated in the physical protection table with a WPPK and a virtual page key chain (VPK Ch) reference;
    assigning to the PPK a set of allocated memory pages, each protected memory page in the set of memory pages having an associated data protection (DP) mask that masks the protected memory page in computer memory;
    generating a virtual page key (VPK) based on the PPK, the VPK identifying the process and a set of data authorized to be used by the process;
    receiving a request to access the set of data via the process;
    determining, in response to the request, a validity of the VPK based on the PPK; and
    making a data access determination based on the validity.

2. The computer-implemented method of claim 1, the at least one table comprising a physical page table.

3. The computer-implemented method of claim 2, the PPK being associated in the physical page table with physical page number (PPN) a data protection (DP) bit array, a write protection page key (WPPK), and a write protection (WP) bit array.

4. The computer-implemented method of claim 1, a set of entries of the physical protection table being associated with a set of entries of a physical page table.

5. The computer-implemented method of claim 1, the VPK Ch reference being associated with an entry of a VPK Ch table.

6. A system for managing data security, comprising:
    a bus;
    a processor coupled to the bus; and
    a memory medium coupled to the bus, the memory medium comprising instructions to:
    identify a computerized process;
    generate a physical page key (PPK) for the computerized process;
    store the PPK in at least one table, the at least one table comprising a physical protection table, the PPK being associated in the physical protection table with a WPPK and a virtual page key chain (VPK Ch) reference;
    assign to the PPK a set of allocated memory pages, each protected memory page in the set of memory pages having an associated data protection (DP) mask that masks the protected memory page in computer memory;
    generate a virtual page key (VPK) based on the PPK, the virtual key identifying the process and a set of data authorized to be used by the process;
    receive a request to access the set of data via the process;
    determine a validity of the VPK based on the PPK; and
    make a data access determination based on the validity.

7. The system of claim 6, the at least one table comprising a physical page table.

8. The system of claim 6, the PPK being associated in the physical page table with physical page number (PPN) a data protection (DP) bit array, a write protection page key (WPPK), and a write protection (WP) bit array.

9. The system of claim 6, a set of entries of the physical protection table being associated with a set of entries of a physical page table.

10. The system of claim 6, the VPK Ch reference being associated with an entry of a VPK Ch table.

11. A computer program product for managing data security, the computer program product comprising a computer readable storage media that is not a signal, and program instructions stored on the computer readable storage media, to:
    identify a computerized process;
    generate a physical page key (PPK) for the computerized process;
    store the PPK in at least one table, the at least one table comprising a physical protection table, the PPK being associated in the physical protection table with a WPPK and a virtual page key chain (VPK Ch) reference;

assign to the PPK a set of allocated memory pages, each protected memory page in the set of memory pages having an associated data protection (DP) mask that masks the protected memory page in computer memory;

generate a virtual page key (VPK) based on the PPK, the VPK identifying the process and a set of data authorized to be used by the process;

receive a request to access the set of data via the process;

determine a validity of the VPK based on the PPK; and make a data access determination based on the validity.

12. The computer program product of claim 11, the at least one table comprising a physical page table.

13. The computer program product of claim 11, the PPK being associated in the physical page table with physical page number (PPN) a data protection (DP) bit array, a write protection page key (WPPK), and a write protection (WP) bit array.

14. The computer program product of claim 11, a set of entries of the physical protection table being associated with a set of entries of a physical page table.

\* \* \* \* \*